UNITED STATES PATENT OFFICE.

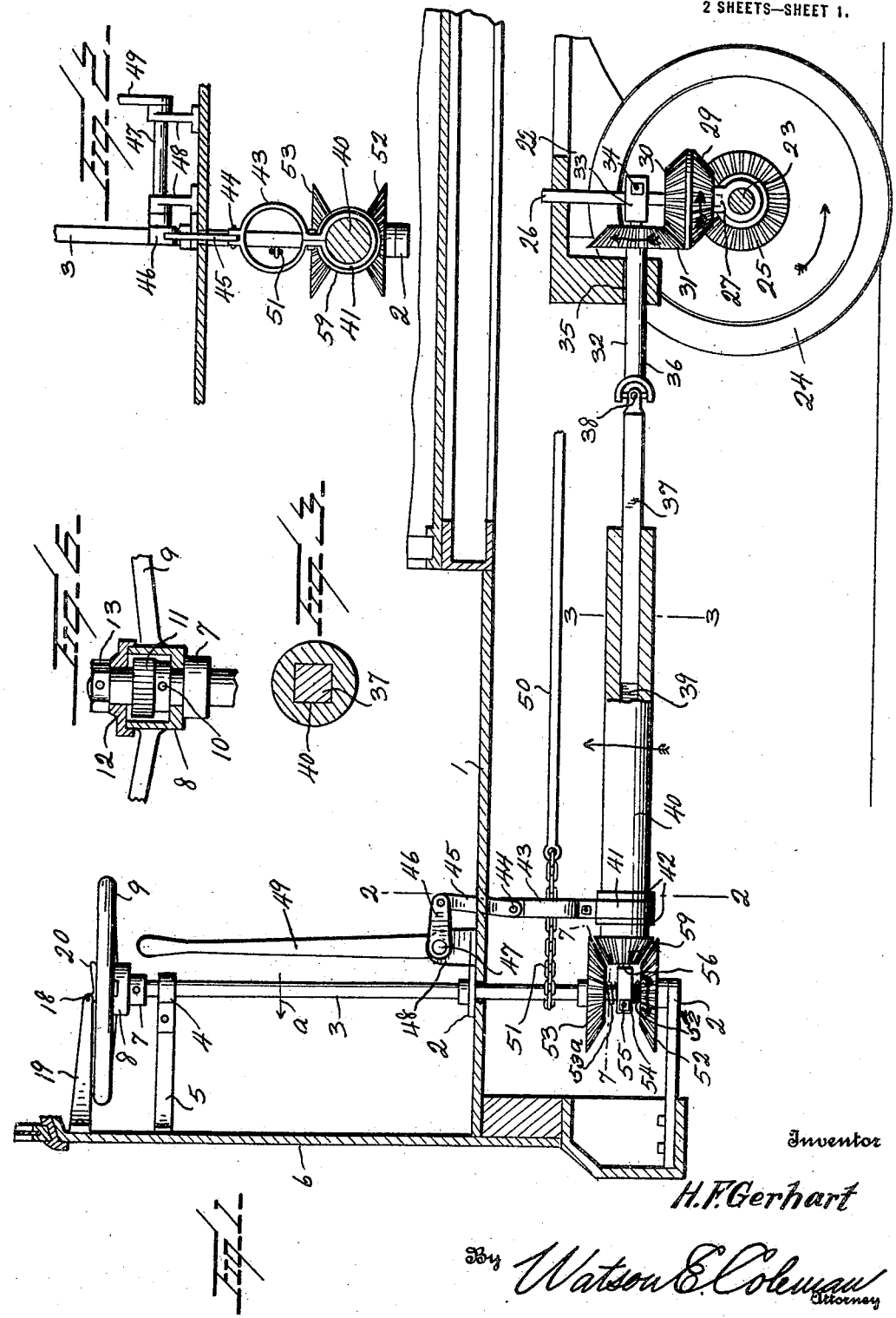

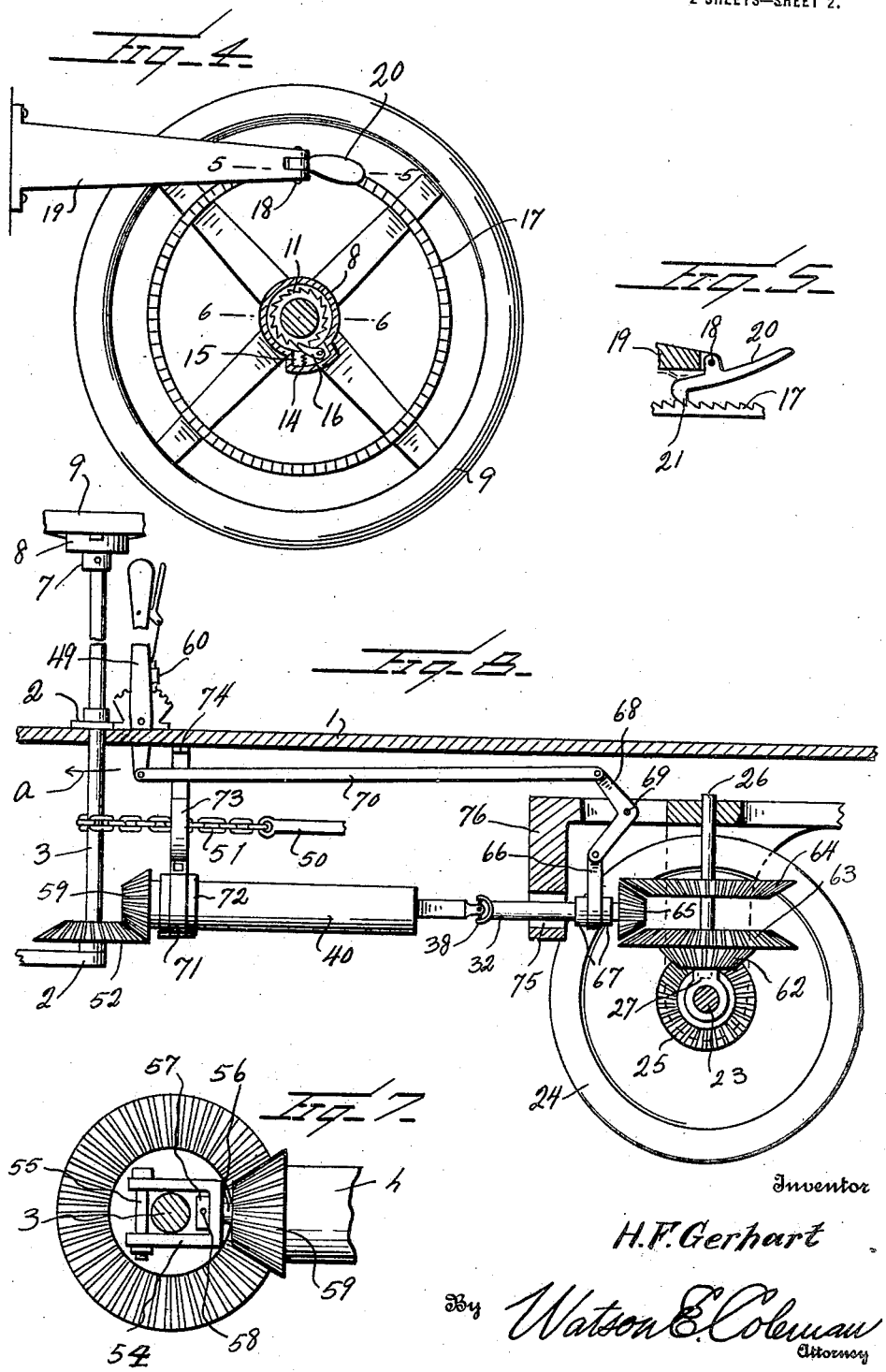

HARVEY F. GERHART, OF PHILADELPHIA, PENNSYLVANIA.

AUTOMATIC BRAKE MECHANISM.

1,417,241.   Specification of Letters Patent.   Patented May 23, 1922.

Application filed October 19, 1920. Serial No. 418,060.

*To all whom it may concern:*

Be it known that I, HARVEY F. GERHART, a citizen of the United States, residing at Philadelphia, in the county of Philadelphia and State of Pennsylvania, have invented certain new and useful Improvements in Automatic Brake Mechanism, of which the following is a specification, reference being had to the accompanying drawings.

On street cars the brakes are usually applied by hand-power through the medium of a hand wheel mounted upon the upper end of the brake stem or shaft, and in using this form of means for applying the brakes, considerable pressure and strength are necessary to insure pressure of the brake shoes on the car wheels, therefore, the purpose of the present invention is to eliminate the use of hand-power in applying brakes, and in view thereof provision of means between the drive axle and the brake stem is afforded, so as to utilize the power from the drive axle to apply the brakes.

A further purpose is the provisions of driving connections between the drive axle and the brake stem including means to be moved into and out of gear with the drive axle, so that the brake shoes can be applied automatically whenever it is desired.

Another purpose is the provision of means to apply the brakes when the car is moving forwardly or rearwardly.

A further purpose embodies the provision of slidable connections between the brake stem and the drive axle of the truck, so that when the truck of the car turns when the car is going around a curve, the connections between the brake stem and the drive axle may shorten or lengthen.

A still further purpose consists in the provision of means to permit the brake stem to be rotated and its connections with the brake mechanism (not shown) to be wound on the stem, without turning the hand wheel at the upper end thereof, in combination with means to hold the hand wheel to prevent retrograde movement of the hand wheel after the brakes have been applied, said last mentioned means being releasable, in order to release the hand wheel, when it is desired to release the brake mechanism.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a longitudinal sectional view of a conventional construction of street car, showing the application of the preferred embodiment of the invention.

Figure 2 is a sectional view on line 2—2 of Figure 1.

Figure 3 is a sectional view on line 3—3 of Figure 1.

Figure 4 is a plan view of the brake stem and the hand wheel, showing the means to permit the brake stem to rotate and wind upon the brake chain without turning the hand wheel.

Figure 5 is a detail sectional view on line 5—5 of Figure 4.

Figure 6 is a detail sectional view on line 6—6 of Figure 4.

Figure 7 is a detail sectional view on line 7—7 of Figure 1.

Figure 8 is a longitudinal sectional view through a portion of the street car showing the application of a modified embodiment of the invention.

Referring to the drawings, 1 designates a portion of conventional form of street car, and mounted in suitable bearings, such as indicated at 2 is a brake stem 3, the upper portion of which is mounted in a bearing 4 of a bracket 5, which is attached in any suitable manner to the dash 6 of the car. Engaged with the upper end of the stem 3 and resting on a collar or shoulder 7 is the hub 8 of a conventional form of hand wheel 9. The hub 8 is hollow, and located therein and secured by a pin 10 on the stem is a ratchet wheel 11. A cap 12 is engaged with the upper extremity of the stem, there being a nut 13 secured on the stem to hold the cap in place. The cap telescopes over the hollow hub of the hand wheel, and necessarily prevents collection of foreign matter in the hub. The hub 8 has an off-set portion 14 provided with a cavity 15, and pivotally mounted therein is a spring tensioned pawl 16, which engages the teeth of the ratchet 11. Carried by the spokes of the hand wheel is a ratchet ring 17, and pivotally mounted at 18 on a support 19 is a hand pawl 20. This hand pawl is also spring tensioned, so as to hold its tooth 21 in engagement with the teeth of the ratchet ring. It will be noted that when the brake stem 3 is rotated in the direction of the arrow $a$, through power transmitted thereto from the drive axle, the stem is free to rotate, without carrying the hand wheel 9 with it. When the power is relieved on the stem and the brake mechanism applied, there is tension on the stem, through the medium of the brake connections, hence the spring tensioned pawl in the cavity 15 will engage the teeth of the ratchet 11 and prevent retrograde movement of the stem, since the hand wheel is prevented from retrograde movement by the tooth 21 of the pawl 20.

The form of street car herein shown is more or less illustrative and of a conventional construction for the purpose of showing an application of the brake actuating mechanism.

However it is well known that the trucks of a street car which carry the supporting wheels are permitted to have slight pivotal movements, hence it is necessary in constructing the present actuating mechanism, to provide a looseness of play between the parts connecting the stem and the drive axle.

Mounted on the truck 22 of the car is a drive axle 23, on which a supporting wheel 24 is mounted. It is obvious that the axle 23 is designed to carry a pair of supporting wheels, but only one wheel is illustrated. Also carried by the axle 23 is a bevel gear 25. A vertical shaft 26 is mounted in a bearing of the truck 22 and in a bearing 27, which is carried by the axle 23, and rotatable with the shaft 26 is a double bevel gear, the lower teeth 29 of which engage the teeth of the bevel gear 25, while the upper teeth 30 engage the teeth of a bevel gear 31, which is mounted upon the shaft section 32. One end of this shaft section 32 is mounted in a bearing of a yoke 33, which straddles the vertical shaft 26, there being a bolt 34 engaging through the arms of the yoke to hold the stem in position on the shaft 26. The shaft section 32 is mounted in a bearing 35 of an arm of the truck 22. The shaft section 32 comprises two parts 36 and 37, which are united by means of a universal joint 38. The part 37 of the shaft section 32 is preferably rectangular in cross section, and telescopically fits a correspondingly shaped bore 39 of the shaft section 40.

The forward end of the shaft section 40 is rotatable in a strap bearing 41, there being shoulders 42 to prevent axial movement of the shaft section 40 relatively to the strap bearing. The strap bearing 41 has a ring portion 43, and pivotally connected at 44 to the ring portion is a link 45, which in turn is pivotally connected to an arm 46 which is carried by a shaft 47 which is mounted in bearings 48 of the car, and on one end of the shaft a lever 49 is mounted for operating the same. The usual brake bar 50 (which is designed for connection with the brake mechanism not shown) is provided, and connected to the forward end thereof is a brake chain 51, which in turn is connected to and partly wound about the brake stem 3. It is obvious that when the brake stem 3 is rotated in the direction of the arrow $a$, the chain 51 will be wound upon the stem, and the brake shoes of the brake mechanism applied.

Fixed on the lower end of the brake stem 3 are bevel gears 52 and 53. A yoke 54 straddles the lower end of the stem between the gears 52 and 53, there being a bolt 55 engaging through the arms of the yoke to hold it in place. The forward reduced end 56 of the shaft section 40 is mounted in the yoke 54, there being a head 57 secured by a pin 58 on the reduced end to hold the parts connected. The shaft section 40 has a bevel gear 59 on its end designed to mesh with either one of the bevel gears 52 and 53.

In order to apply the brake shoes of the brake mechanism (not shown), the motorman may grasp the lever 49 and move the same rearwardly, which will impart a downward movement of the connections with the shaft 40, and tilt the shaft so that the bevel gear 59 will mesh with the gear 52. Above and below the yoke 54 springs $53^a$ and $52^a$ are arranged, acting to hold the yoke centered between the bevel gears 52 and 53, and the bevel gear 59 out of engagement with the gears 52 and 53. However when the gear 59 is moved downwardly in mesh with the gear 52 the spring $52^a$ is compressed, and when the gear 59 is moved up in mesh with the gear 53, the spring $53^a$ is compressed. When hand power is released on the lever 49, the gear 59 automatically becomes disengaged from one or the other of the gears 52 and 53. When the gear 59 is moved in mesh with the gear 52, the axle 23 will transmit power to the shaft 26 through the gear 29, and then through the shaft section 40, and since the shaft 32 is slidably connected with the shaft section 40 power may be transmitted to the brake stem 3, which will cause the brake chain to wind thereon. As the chain 41 winds on the stem, pulling action will be imparted on the brake bar 50, thereby causing the brake shoes of the brake mechanism to be applied. A movement of the lever 49 in a forward direction, will move the gear 59 in mesh with the bevel gear 53, which will cause the brake shoes of the brake mechanism to be applied, when the car is moving rearwardly.

The telescopical connections between the shaft section 32 and the shaft section 40 are afforded, so as to accommodate the slight pivotal movements of the truck, which carry the drive axle and supporting wheels. Also the universal joint 38 is provided in order to permit of the slight pivotal connection of the truck relatively to the shaft connections between the drive axle and the brake stem.

When the brake stem 3 is rotated, and the chain 51 winds thereon, it rotates without turning or rotating the hand wheel 9. As soon as the lever 49 is released, and the bevel gear 59 is disengaged from 52, the brake chain 51 acts to reverse the movement of the stem 3. However this is prevented by means of the spring tensioned pawl, while the hand wheel is prevented from retrograde movement by the hand wheel pawl 20. When it is desired to release the brake mechanism, the hand pawl is depressed, disengaging the tooth 21 from the teeth of the ratchet ring 17, then the motorman may permit the hand wheel to rotate or move through the hands, allowing the brake shoes to return to their normal positions.

In Figure 8 the driving connections between the stem 3 and the drive axle are somewhat reversed. For instance instead of the shaft section 40 being tilted at its forward end, the shaft section 32 is tilted at its rear ends, in order to apply the brake mechanism. Mounted upon the shaft 26 in Figure 8 is a double gear, the lower teeth 62 of which engage the teeth of the gear 25, while the upper teeth 63 are utilized in transmitting power to the shaft section 32. Also on the shaft 26 is a bevel gear 64 oppositely disposed to the teeth 63 of the bevel gear 61. As previously stated the rear end of the shaft section 32 is raised or lowered, for the purpose of causing its bevel gear 65 to mesh either with the teeth 63 of the bevel gear 61 or with the bevel gear 64. A link 66 is swivelled between the shoulders 67 of the shaft section 32, and is in turn pivoted to one arm of the bell crank lever 68, which is pivotally mounted at 69 on the truck of the car. The other arm of the bell crank lever is connected to the lever 49 by means of the link 70. It is obvious that by moving the lever 49 in Figure 8 rearwardly, the link 70 will move forwardly, and the bell crank lever 68 tilted downwardly, thereby causing the bevel gear 65 to mesh with 63, hence the brake stem 3 will be rotated in the direction of the arrow $a$ in Figure 8, causing the brake shoes of the brake mechanism to be applied. A reverse movement of the lever 49 in Figure 8 will raise the gear 65 into mesh with the gear 64, causing the brake shoes of the brake mechanism to be applied when the car is moving rearwardly.

The shaft section 40 in Figure 8 is mounted in a strap bearing 71, which is swivelled between the shoulders 72. This strap bearing has a ring portion 73, and the upper portion of the strap bearing is secured at 74 to the underface of the floor of the car. The brake chain 51 in the preferred and modified embodiments of the invention move through the ring portions 43 and 73 of the strap bearings. The shaft section 32 in Figure 8 is mounted in a slot 75 of the arm 76 of the yoke. This slot extends vertically, so as to permit a raising and lowering of the shaft section 32. However the slot 75 is of a width, to prevent lateral movement of the shaft section 32 in Figure 8.

The yoke 33 is similar in construction to the yoke 54.

In Figure 8 the lever 49 may be held in different adjusted positions by means of the hand grip operated dog 60 engaging the rack.

The invention having been set forth, what is claimed as being useful is:—

1. In a mechanism for automatically applying brakes, the combination with a brake stem having means for connection with brake shoes, of a driving mechanism for the stem, means shiftably connecting the mechanism and the stem for periodically transmitting power to the stem, means for shifting said shiftable means, whereby the stem may be periodically operated, a hand wheel loosely mounted on one end of the stem, a ratchet and pawl device connecting the hand wheel and the stem to hold the wheel movable with the stem in one direction, said hand wheel having a band ratchet, a fixed support, and a pawl mounted on the support and engaging the band ratchet, to hold the hand wheel against movement in the opposite direction, while the stem is being driven by the driving mechanism to apply the brakes.

2. In a mechanism for automatically applying brakes, the combination with periodically driven and continually driving elements, of an extensible and flexible connector, one end of said connector being shiftably connected in and out of gear with one of said elements, the other end of said connector being positively and operatively connected to the other element, means manually operated and operatively connected with the connector for shifting it into gear with one of said elements, for driving the same means operatively connected with one of the elements, and in turn adapted to connect with the brake shoes, whereby upon driving said element the brake shoes may be applied, a hand wheel on one end of one of the elements, a ratchet and pawl connecting the hand wheel and its element to permit its element to rotate in one direction, a band ratchet, a fixed support, and a manually operated device to engage the band ratchet to hold the hand wheel against movement, whereby the element on which the hand wheel is mounted may rotate independently of the hand wheel, for applying the brake shoes.

3. In a mechanism for automatically applying brakes, a brake stem having means for connection with the brake shoes, a driving mechanism, an extensible and flexible shaft operatively connected to and driven by said driving mechanism, a pair of opposed driven members on said stem, means carried by said shaft and adapted to engage with one or the other of said opposed driven members, a yoke straddling said stem and being connected to the end of said shaft for guiding the shaft in its shifting movement, yieldable means between the yoke and each of the driven members, for holding the member carried by the shaft in a neutral position between the opposed driven members, means manually actuated for shifting the shaft into and out of gear with one or the other of said driven members of the stem, means for holding and preventing retrograde movement of the stem when it is driven to apply the brake shoes, and means to permit of the release of said stem when the shaft is shifted to a neutral position, whereby the brake shoes may return to normal positions.

In testimony whereof I hereunto affix my signature.

HARVEY F. GERHART.